US011864188B2

(12) United States Patent
Yeo et al.

(10) Patent No.: US 11,864,188 B2
(45) Date of Patent: Jan. 2, 2024

(54) METHOD AND APPARATUS FOR SCHEDULING AND TRANSMITTING DATA IN WIRELESS CELLULAR COMMUNICATION SYSTEM

(71) Applicant: Samsung Electronics Co., Ltd., Suwon-si (KR)

(72) Inventors: Jeongho Yeo, Suwon-si (KR); Taehyoung Kim, Suwon-si (KR); Sungjin Park, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/044,842

(22) PCT Filed: Mar. 29, 2019

(86) PCT No.: PCT/KR2019/003727
§ 371 (c)(1),
(2) Date: Oct. 1, 2020

(87) PCT Pub. No.: WO2019/194478
PCT Pub. Date: Oct. 10, 2019

(65) Prior Publication Data
US 2021/0136805 A1 May 6, 2021

(30) Foreign Application Priority Data
Apr. 6, 2018 (KR) .................. 10-2018-0040589

(51) Int. Cl.
*H04W 72/23* (2023.01)
*H04W 72/0446* (2023.01)
(Continued)

(52) U.S. Cl.
CPC ....... *H04W 72/23* (2023.01); *H04W 72/0446* (2013.01); *H04W 72/1268* (2013.01); *H04W 72/53* (2023.01); *H04W 72/535* (2023.01)

(58) Field of Classification Search
CPC .......... H04W 72/1289; H04W 72/042; H04W 72/0446; H04W 72/0493; H04W 72/1257; H04W 72/1268; H04W 72/1278
See application file for complete search history.

(56) References Cited

U.S. PATENT DOCUMENTS

2018/0049203 A1  2/2018  Xue et al.
2018/0098361 A1  4/2018  Ji et al.
(Continued)

FOREIGN PATENT DOCUMENTS

KR  10-2018-0011022 A  1/2018
WO  2018030864 A1  2/2018

OTHER PUBLICATIONS

International Search Report and Written Opinion of the International Searching Authority in connection with International Application No. PCT/KR2019/003727 dated Jul. 4, 2019, 9 pages.
(Continued)

*Primary Examiner* — Jael M Ulysse

(57) ABSTRACT

The present disclosure relates to a communication technique for converging, with an IoT technology, a 5G communication system for supporting a higher data transfer rate than 4G systems, and a system therefor. The present disclosure may be applied to 5G communication technology and IoT related technology-based intelligent services (for example, smart homes, smart buildings, smart cities, smart cars or connected cars, health care, digital education, retail, security and safety related services, etc.). The present invention relates to a scheduling method and apparatus for uplink data transmission and downlink data reception.

12 Claims, 14 Drawing Sheets

(51) Int. Cl.
*H04W 72/1268* (2023.01)
*H04W 72/53* (2023.01)
*H04W 72/50* (2023.01)

(56) References Cited

U.S. PATENT DOCUMENTS

| | | | |
|---|---|---|---|
| 2019/0082431 A1* | 3/2019 | Yi | H04W 72/0446 |
| 2019/0149365 A1* | 5/2019 | Chatterjee | H04L 25/0226 |
| | | | 370/329 |
| 2019/0150142 A1* | 5/2019 | Huang | H04W 72/23 |
| | | | 370/336 |
| 2019/0159213 A1* | 5/2019 | Baldemair | H04L 5/0094 |
| 2019/0222357 A1* | 7/2019 | Huang | H04L 5/0094 |
| 2019/0268103 A1* | 8/2019 | Park | H04L 1/1812 |
| 2019/0342865 A1 | 11/2019 | Shin et al. | |
| 2020/0107300 A1* | 4/2020 | Kwak | H04L 5/0094 |
| 2020/0120692 A1* | 4/2020 | Park | H04W 72/0446 |
| 2020/0252978 A1* | 8/2020 | Yi | H04L 5/0044 |
| 2020/0280983 A1* | 9/2020 | Huang | H04L 5/0053 |
| 2021/0007086 A1* | 1/2021 | Liu | H04W 56/001 |

OTHER PUBLICATIONS

Asustek, "Discussion on data scheduling," R1-1800767, 3GPP TSG RAN WG1 Meeting AH 1801, Vancouver, Canada, Jan. 22-26, 2018, 3 pages.

ETRI, "Remaining issues on time domain resource allocation," R1-1800410, 3GPP TSG RAN WG1 Meeting AH 1801 Vancouver, Canada, Jan. 22-26, 2018, 5 pages.

ZTE, et al., "Remaining details of RMSI," R1-1717032, 3GPP TSG RAN WG1 Meeting #90bis, Prague, Czech Republic, Oct. 9-13, 2017, 12 pages.

* cited by examiner

METHOD AND APPARATUS FOR SCHEDULING AND TRANSMITTING DATA IN WIRELESS CELLULAR COMMUNICATION SYSTEM

CROSS-REFERENCE TO RELATED APPLICATIONS

This application is a 371 National Stage of International Application No. PCT/KR2019/003727, filed Mar. 29, 2019, which claims priority to Korean Patent Application No. 10-2018-0040589, filed Apr. 6, 2018, the disclosures of which are herein incorporated by reference in their entirety.

BACKGROUND

1. Field

The disclosure relates to a wireless communication system, and particularly to a method and an apparatus for scheduling uplink and downlink transmissions. More specifically, the disclosure relates to a method for indicating a time domain in which data is mapped, when uplink data and downlink data are scheduled.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, in line with recent research on next-generation communication systems, various schemes for scheduling communication with terminals are being studied. Accordingly, there is a demand for a scheme for efficient scheduling in view of characteristics of the next-generation communication systems.

SUMMARY

In a wireless communication system, particularly a new radio (NR) system, when a base station schedules a physical downlink shared channel (PDSCH) or a physical uplink shared channel (PUSCH) to a terminal, information regarding resources in a time domain to be used to transmit control information is included and delivered. For example, downlink control information (DCI) including scheduling information may be used to indicate which orthogonal frequency division multiplexing (OFDM) symbols in which slot will be used as the PDSCH or PUSCH. Such indication information may include information regarding the slot, the starting symbol, and symbol numbers. A time-domain resource indicated by the DCI may be one of candidate values already configured for the terminal by means of upper-level signaling, such as radio resource control (RRC).

Meanwhile, before initially accessing the base station, before receiving an RRC configuration, or before RRC connection is made, the terminal may not know candidate values configured for the terminal by means of upper-level signaling described above. Even in this case, the base station needs to be able to indicate, to the terminal, the time-domain resource for PDSCH or PUSCH transmission through the DCI.

The disclosure provides a method wherein a base station indicates a time-domain resource to a terminal by using DCI before an RRC configuration is received, or before RRC connection is made, when PUSCH transmission is scheduled. More specifically, the disclosure provides a method and an apparatus for determining and indicating a time-domain resource in view of the position of a control resource set (CORESET) used to transmit DCI and the minimum processing time of the terminal.

A method of a terminal according to an embodiment, in order to solve the above-mentioned problems, includes the steps of: receiving, from the base station, downlink control information (DCI) including scheduling information through a control resource set (CORESET); determining a time resource set indicated by the scheduling information according to a first scheme or a second scheme, based on a position of the CORESET in a slot; and communicating with the base station according to the scheduling information, based on the determined time resource set.

A terminal according to an embodiment, in order to solve the above-mentioned problems, includes: a transceiver configured to transmit and receive a signal; and a controller configured to receive, from the base station, downlink control information (DCI) including scheduling information through a control resource set (CORESET), to determine a time resource set indicated by the scheduling information according to a first scheme or a second scheme, based on a position of the CORESET in a slot, and to communicate with the base station according to the scheduling information, based on the determined time resource set.

A method of a base station according to an embodiment, in order to solve the above-mentioned problems, includes the steps of: transmitting, to the terminal, downlink control information (DCI) including scheduling information through a control resource set (CORESET); and communicating with the terminal according to the scheduling information, wherein a time resource set indicated by the scheduling information is determined according to a first scheme or a second scheme, based on a position of the CORESET in a slot.

A base station according to an embodiment, in order to solve the above-mentioned problems, includes: a transceiver configured to transmit and receive a signal; and a controller configured to transmit, to the terminal, downlink control information (DCI) including scheduling information through a control resource set (CORESET), and to communicate with the terminal according to the scheduling information, wherein a time resource set indicated by the scheduling information is determined according to a first scheme or a second scheme, based on a position of the CORESET in a slot.

According to the disclosure, as described above, when a base station indicates a time-domain resource for transmitting a PUSCH or PDSCH to a terminal in connection with scheduling the PUSCH or PDSCH for the terminal, the base station may indicate information of the time-domain resource in view of the minimum processing time of the terminal before RRC connection or in a default mode, and may schedule the terminal so as to transmit the PUSCH or to receive the PDSCH in the time-domain resource.

DETAILED DESCRIPTION

Figure 1:
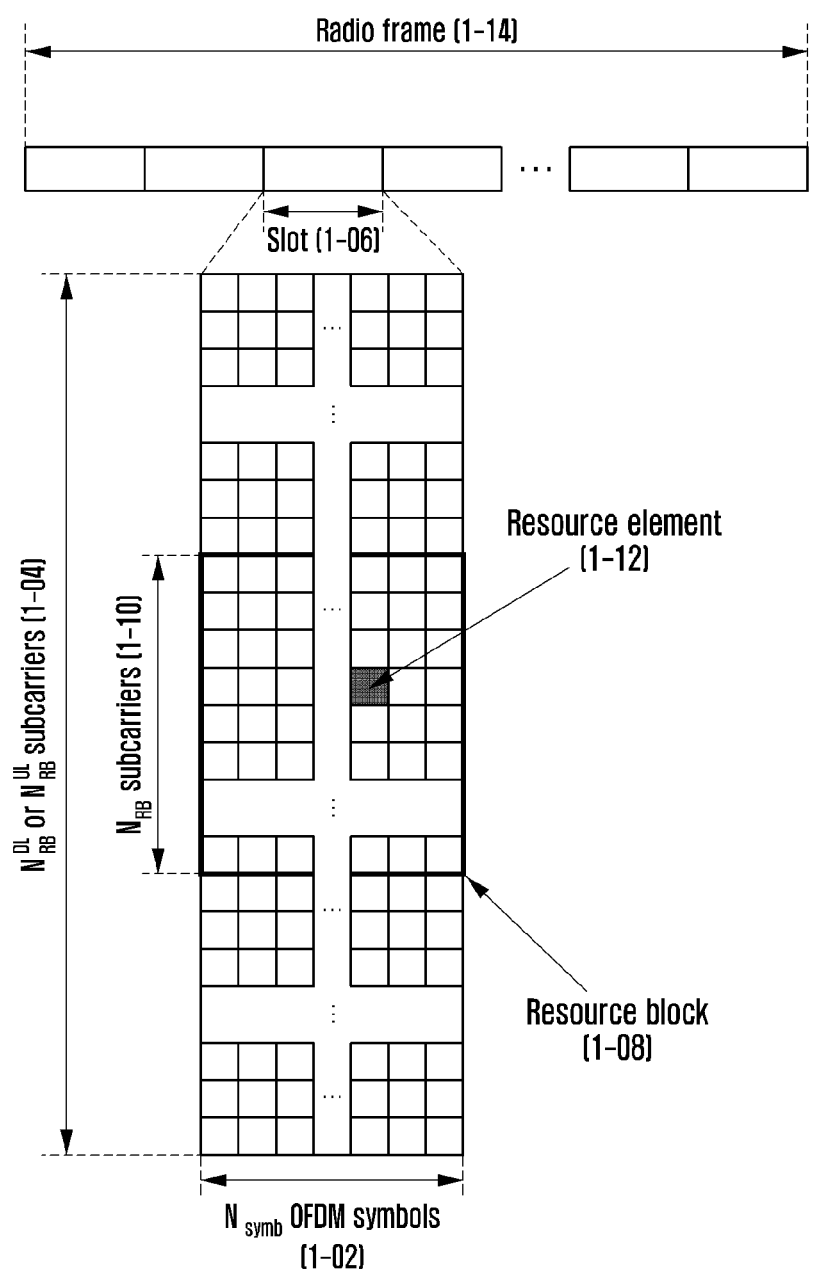
FIG. 1 is a diagram illustrating a downlink or uplink time-frequency domain transmission structure of a new radio system according to an embodiment of the disclosure.

Hereinafter, exemplary embodiments of the disclosure will be described in detail with reference to the accompanying drawings. Here, it should be noted that, in the accompanying drawings, the same or like elements are designated by the same or like reference signs as much as possible. Further, a detailed description of known functions or configurations which may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Meanwhile, in the case of new radio (NR) access technology, which is a new type of 5G communication, design is being made such that various services can be freely multiplexed in time and frequency resources, and the waveform/numerology or the like, and the reference signal or the like can accordingly be assigned dynamically or freely according to the need of the corresponding service. In order to provide a terminal with an optical service in wireless communication, it is important to transmit optimized data based on measurement of the amount of interference and the quality of the channel, and this makes accurate channel state measurement critical. However, unlike 4G communication in which channel and interference characteristics do not change substantially depending on the frequency resource, a 5G channel undergoes substantial changes in channel and interference characteristics depending on the service, and a subset in the frequency resource group (FRG) dimension needs to be supported such that the same can be divided and measured. Meanwhile, in the case of the NR system, types of supported services may be divided into the following categories: enhanced mobile broadband (eMBB), massive machine-type communications (mMTC), ultra-Reliable and low-latency communications (URLLC), and the like. The eMBB may be regarded as a service intended for high-speed transmission of a large amount of data, the mMTC may be regarded as a service intended for terminal power minimization and access to multiple terminals, and the URLLC may be regarded as a service intended for high reliability and low latency. Different requirements may be applied depending on the type of the service applied to the terminal.

Multiple services may be provided to the user in such a communication system, and in order to provide the user with such multiple services, there is a demand for a method capable of providing services in the same time interval so as to conform to characteristics of respective services, and an apparatus using the same.

Hereinafter, embodiments of the disclosure will be described in detail with reference to the accompanying drawings.

Wireless communication systems have evolved from initial-stage systems that provide voice-based services to broadband wireless communication systems that provide high-speed/high-quality packet data services according to communication standards such as high-speed packet access (HSPA) of 3GPP, long term evolution (LTE) or evolved universal terrestrial radio access (E-UTRA), LTE-advanced (LTE-A), high-rate packet data (HRPD) of 3GPP2, ultra-mobile broadband (UMB), and 802.16e of IEEE. In addition, 5G or new radio (NR) communication standards are being made by using 5G wireless communication systems.

The NR system, which is a representative example of the broadband wireless communication system, employs an orthogonal frequency division multiplexing (OFDM) scheme in the downlink (DL) and the uplink (UL). More specifically, a cyclic prefix OFDM (CP-OFDM) scheme is employed in the downlink, and both the CP-OFDM and a discrete Fourier transform spreading OFDM (DFT-S-OFDM) are employed in the uplink. The uplink refers to a radio link through which a terminal (user equipment (UE) or mobile station (MS)) transmits data or a control signal to a base station (BS, or gNode B), and the downlink refers to a radio link through which the base station transmits data or a control signal to the terminal. According to the above-mentioned multi-access scheme, time-frequency resources to convey or control information are usually assigned and managed so as not to overlap each other (that is, such that orthogonality is established) with regard to each user, thereby distinguishing data or control information of each user.

The NR system employs a hybrid automatic repeat request (HARQ) scheme in which, if a decoding failure occurs during the initial transmission, corresponding data is retransmitted in the physical layer. According to the HARQ scheme, if the receiver fails to accurately decode data, the receiver transmits information indicating the decoding failure (negative acknowledgement (NACK)) to the transmitter such that the transmitter can retransmit corresponding data in the physical layer. The receiver combines data retransmitted by the transmitter with previous data that has failed to be decoded, thereby improving the data receiving performance. In addition, if the receiver has accurately decoded data, the receiver may transmit information indicating the decoding success, acknowledgement (ACK), to the transmitter such that the transmitter can transmit new data.

FIG. 1 is a diagram illustrating the basic structure of a time-frequency domain, which is a radio resource domain used to transmit the data or control channel in the downlink or uplink in an NR system.

In FIG. 1, the horizontal axis refers to a time domain, and the vertical axis refers to a frequency domain. The minimum transmission unit in the time domain is an OFDM symbol, and a group of as many as Nsymb OFDM symbols 1-02 constitutes a slot 1-06. The length of a subframe is defined as 1.0 ms, and a radio frame 1-14 is defined as 10 ms. The minimum transmission unit in the frequency domain is a subcarrier, and the bandwidth of the entire system transmission band (transmission bandwidth) is defined as a total of NBW subcarriers 1-04.

The basic unit of resources in the time-frequency domain is a resource element (RE) 1-12, which may be described in terms of an OFDM symbol index and a subcarrier index. A resource block (RB) 1-08 or a physical resource block (PRB) is defined as Nsymb consecutive OFDM symbols 1-02 in the time domain and NPB consecutive subcarriers 1-10 in the frequency domain. Therefore, one RB 1-08 includes Nsymb×NRB REs 1-12. In general, the minimum transmission unit of data is the RB unit. In general, Nsymb=14, NRB=12 in the NR system, and NBW and NRB are proportional to the bandwidth of the system transmission band. The data rate may increase in proportion to the number of RBs scheduled for the terminal. In the NR system, in the case of an FDD system which divides and manages the downlink and the uplink in terms of frequency, the downlink transmission bandwidth and the uplink transmission bandwidth may differ from each other. A channel bandwidth refers to an RF bandwidth corresponding to the system transmission bandwidth. Table 1 below shows a correspondence between a system transmission bandwidth and a channel bandwidth defined for an LTE system (4G wireless communication prior to NR system). For example, an LTE system having a channel bandwidth of 10 MHz has a transmission bandwidth including 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In the NR system, scheduling information regarding downlink data or uplink data is delivered from a BS to a terminal through downlink control information (DCI). The DCI is defined according to various formats, and may indicate, according to each format, whether the same is scheduling information (UL grant) regarding uplink data or scheduling information (DL grant) regarding downlink data, whether nor the same is compact DCI having a small control information size, whether or not spatial multiplexing that uses multiple antennas is applied, whether or not the same is DCI for power control, and the like. For example, DCI format 1-1, which is scheduling control information (DL grant) regarding downlink data, may include at least one of the following pieces of control information:

Carrier indicator: indicates which frequency carrier is used for transmission.

DCI format indicator: indicates whether corresponding DCI is for the downlink or for the uplink.

Bandwidth part (BWP) indicator: indicated which BWP is used for transmission.

Frequency-domain resource assignment: indicates the RB in the frequency domain, which has been assigned for data transmission. The expressed resource is determined according to the system bandwidth and the resource assignment scheme.

Time-domain resource assignment: indicates which OFDM symbol of which slot will be used to transmit a data-related channel.

VRB-to-PRB mapping: indicates which scheme will be used to map a virtual RB (VRB) index and a physical RB (PRB) index.

Modulation and coding scheme (MCS): indicates the modulation scheme used for data transmission and the size of the transport block, which is the data to be transmitted.

HARQ process number: indicates the process number of HARQ.

New data indicator: indicates whether HARQ initial transmission or retransmission.

Redundancy version: indicates the redundancy version of HARQ.

Transmit power control (TPC) command for physical uplink control channel (PUCCH): indicates a transmit power control command regarding a PUCCH, which is an uplink control channel.

In the case of the PUSCH transmission, time-domain resource assignment may be indicated by information regarding the slot to transmit the PUSCH, the starting symbol position S in the corresponding slot, and the number L of symbols to which the PUSCH is mapped. The S may be a relative position from the start of the slot, L may be the number of consecutive symbols, and S and L may be determined from a start and length indicator value (SLIV) defined as in the following process:

If (L−1)≤7 then
SLIV=14*(L−1)+S
else
SLIV=14*(14−L+1)+(14−1−S)
where 0<L≤14−S

A terminal in the NR system may normally have a table configured by the BS through an RRC configuration, the table including, in one row, the SLIV value, the PUSCH mapping type, and information regarding the slot used to transmit the PUSCH. The BS may then indicate the index value of the configured table during time-domain resource assignment of the DCI, thereby delivering the SLIV value, the PUSCH mapping type, and information regarding the slot used to transmit the PUSCH to the terminal.

The NR system has type A and type B defined for the PUSCH mapping type. In the case of PUSCH mapping type A, the first symbol of the demodulation reference signal (DMRS) symbols is positioned in the second or third OFDM symbol in the slot. In the case of PUSCH mapping type B, the first symbol of the DMRS symbols is positioned in the first OFDM symbol in the time-domain resource assigned for PUSCH transmission.

The DCI may undergo channel coding and demodulation processes and may then be transmitted through a physical downlink control channel (PDCCH), which is a downlink physical control channel (or control information, hereinafter, used interchangeably).

In general, the DCI is transmitted in the following manner: the same is independently scrambled as a specific radio network temporary identifier (RNTI) (or terminal identifier) with regard to each terminal, a cyclic redundancy check (CRC) is added thereto, the same is channel-coded and is then configured as each independent PDCCH, which is then transmitted. The PDCCH is mapped in a control resource set (CORESET) configured for the terminal, and then transmitted.

Downlink data may be transmitted through a physical downlink shared channel (PDSCH), which is a physical channel for downlink data transmission. The PDSCH may be transmitted after the control channel transmit interval, and scheduling information regarding the PDSCH, such as the specific mapping position in the frequency domain, the modulation scheme, and the like, is determined based on the DCI transmitted through the PDCCH.

Through the MCS among control information constituting the DCI, the BS notifies the terminal of the modulation scheme applied to the PDSCH to be transmitted, and the size of data to be transmitted (transport block size (TBS)). In an embodiment, the MCS may include five bits, or bits more or less than the same. The TB S corresponds to a size before channel coding for error correction is applied to the data (transport block (TB)) to be applied to the BS.

In the disclosure, a "transport block (TB)" may include a medium access control (MAC) header, a MAC control element (CE), at least one MAC service data unit (SDU), and padding bits. Alternatively, the TB may refer to the unit of data delivered from the MAC layer to the physical layer, or MAC protocol data unit (PDU).

Modulation schemes supported in the NR system include quadrature phase shift keying (QPSK), 16 quadrature amplitude modulation (QAM), 64QAM, and 256QAM, the modulation order (Qm) of each corresponding to 2, 4, 6, and 8. That is, in the case of the QPSK modulation, two bits can be transmitted per symbol; in the case of the 16QAM modulation, four bits can be transmitted per symbol; in the case of the 64QAM modulation, six bits can be transmitted per symbol; and in the case of the 256QAM modulation, eight bits can be transmitted per symbol.

Figure 2:
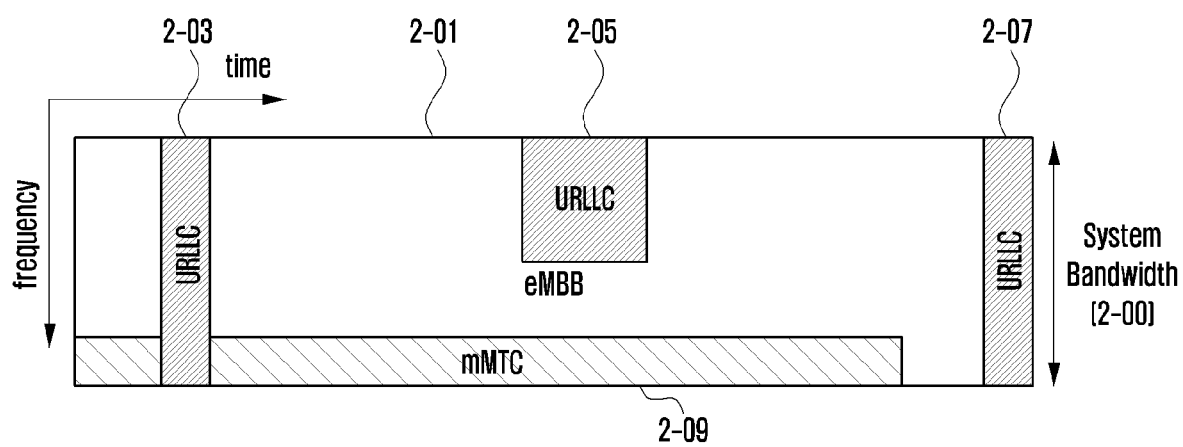
FIG. 2 illustrates pieces of data for eMBB, URLLC, and mMTC assigned in a frequency-time resource in a communication system according to an embodiment of the disclosure.
Figure 3:
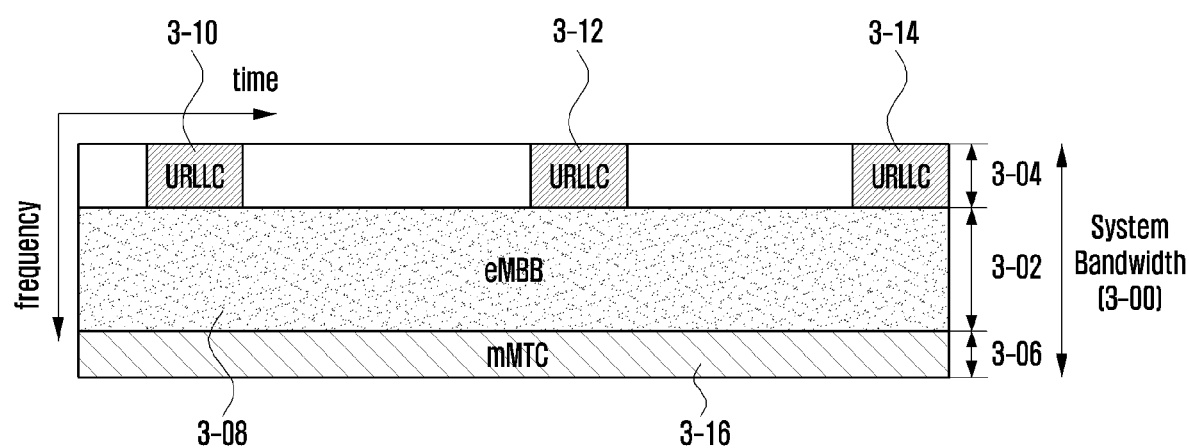
FIG. 3 illustrates pieces of data for eMBB, URLLC, and mMTC assigned in a frequency-time resource in a communication system according to an embodiment of the disclosure.

FIG. 2 and FIG. 3 illustrate pieces of data for eMBB, URLLC, and mMTC, which are services considered in the 5G or NR system, assigned in frequency-time resources. FIG. 2 and FIG. 3 illustrate schemes of assigning frequency and time resources for information transmission in respective systems.

First, FIG. 2 illustrates pieces of data for eMBB, URLLC, and mMTC assigned in the entire system frequency band 2-00. If URLLC data 2-03, 2-05, and 2-07 occurs and needs to be transmitted while eMBB 2-01 and mMTC 2-09 are assigned in specific frequency bands and transmitted, the URLLC data 2-03, 2-05, and 2-07 may be transmitted without emptying or transmitting the parts to which the eMBB 2-01 and mMTC 2-09 have already been assigned. In the case of the URLLC, among the services, the latency needs to be reduced due to the characteristics thereof, and URLLC data may be assigned (2-03, 2-05, and 2-07) to parts of the resource 2-01 to which eMBB has been assigned. Of course, if URLLC is additionally assigned to a resource to which eMBB has been assigned and then transmitted, eMBB data may not be transmitted in the overlapping frequency-time resource, and the eMBB data transmission performance may accordingly degrade. That is, in the above case, URLLC assignment may result in an eMBB data transmission failure.

In FIG. 3, the entire system frequency band 3-00 may be divided and used to transmit services and data in respective sub-bands 3-02, 3-04, and 3-06. Information regarding configuration of the sub-bands may be predetermined, and this information may be transmitted by the BS to the terminal through upper-level signaling. Alternatively, the BS or network node may divide information regarding the sub-bands as desired and may provide services to the terminal without transmitting separate sub-band configuration information. FIG. 3 illustrates sub-band 3-02, which is used for eMBB data transmission, sub-band 3-04, which is used for URLLC data transmission, and sub-band 3-06, which is used for mMTC data transmission.

The transmission time interval (TTI) used for URLLC transmission throughout the embodiment may have a length smaller than the length of the TTI used for eMBB or mMTC transmission. In addition, a response to information related to URLLC may be transmitted faster than in the case of eMBB or mMTC, and information may accordingly be transmitted/received with a low latency.

Meanwhile, the structure of a physical layer channel used for each type in order to transmit the above three kinds of services or data may differ. For example, at least one of the length of the TTI, the frequency resource assignment unit, the control channel structure, and the data mapping method may differ. For example, assuming that the normal TTI of the NR system is a slot, a TTI used for URLLC transmission may be referred to as a mini-slot including a smaller number of OFDM symbols than the slot. If the slot includes fourteen OFDM symbols, the mini-slot may include OFDM symbols less than fourteen, for example, two, four, or seven OFDM symbols.

Although three kinds of services and three kinds of data were assumed in the above description, more kinds of services and corresponding data may exist, and the content of the disclosure may also be applied to such a case.

In order to describe a method and an apparatus proposed in an embodiment, terms "physical channel" and "signal" in the NR system may be used. However, the content of the disclosure is also applicable to other wireless communication systems having similar technical backgrounds or channel types than the NR system.

Hereinafter, a base station refers to an entity configured to assign resources to a terminal, and may be at least one of a gNode B (gNB), an eNode B (eNB), a Node B, a base station (BS), a wireless access unit, a BS controller, or a node on a network. A terminal may include user equipment (UE), a mobile station (MS), a cellular phone, a smartphone, a computer, or a multimedia system capable of performing a communication function. In the disclosure, conventional terms "physical channel" and "signal" may be used interchangeably with data or control signal. For example, a PDSCH refers to a physical channel to transmit data, but the PDSCH may also be referred to as data for convenience of description. Likewise, a PDCCH refers to a physical channel to transmit a control signal (or control information), but the PDCCH may hereinafter be referred to as a control signal for convenience of description.

Hereinafter, upper-level signaling as used herein refers to a method in which signals are delivered from a base station to a terminal by using a downlink data channel of the physical layer, or from the terminal to the base station by using an uplink data channel of the physical layer, and may be referred to as an RRC signaling or MAC control element (CE).

The following embodiments provide a method and an apparatus for indicating and determining a time-domain resource through PUSCH scheduling, before the terminal has established RRC connection with the base station, or when the above-mentioned table including the SLIV value, the PUSCH mapping type, and information regarding the slot to transmit the PUSCH in one row has not been configured through upper-level signaling.

In the disclosure, before the terminal has established RRC connection with the base station, or when the above-mentioned specific table including the SLIV value, the PUSCH mapping type, and information regarding the slot to transmit the PUSCH in one row has not been configured through upper-level signaling, a table used by the terminal to interpret an indicator that indicates time-domain resource information in DCI for scheduling the PUSCH may be referred to as a default table. Alternatively, the above-mentioned method may be referred to as a default time-domain resource assignment method. For example, Table 2 may be defined as below, and the base station may indicate the value of i, which is row index, in the DCI in Table 2 below, thereby assigning a PUSCH default time-domain resource to the terminal.

TABLE 2

| i | PUSCH mapping type | $K_2$ | S | L |
|---|---|---|---|---|
| 0 | Type A | j | 0 | 14 |
| 1 | Type A | j | 0 | 12 |
| 2 | Type A | j | 0 | 10 |
| 3 | Type B | j | 2 | 12 |
| 4 | Type B | j | 2 | 10 |
| 5 | Type B | j | 2 | 8 |
| 6 | Type B | j | 4 | 10 |
| 7 | Type B | j | 4 | 8 |
| 8 | Type B | j | 4 | 6 |
| 9 | Type A | j + 1 | 0 | 14 |
| 10 | Type A | j + 1 | 0 | 12 |
| 11 | Type A | j + 1 | 0 | 10 |
| 12 | Type A | j + 2 | 0 | 14 |
| 13 | Type A | j + 2 | 0 | 12 |
| 14 | Type A | j + 2 | 0 | 10 |

In Table 2 above, j may be defined differently according to the subcarrier spacing. For example, the same may be defined as 1 at 15 kHz and 30 kHz, may be defined as 2 at 60 kHz, and may be defined as 3 at 120 kHz.

In Table 2 above, K2 may be defined as having such a meaning that, when DCI for scheduling a PUSCH has been transmitted through a specific slot, the PUSCH will be transmitted through the K2th slot therefrom. This means that the PUSCH will be transmitted during L OFDM symbols, starting from the Sth OFDM symbol, from the start of the slot used to transmit the PUSCH. For example, if the time-domain resource indicator of the PUSCH to be transmitted at a subcarrier spacing of 30 kHz indicates i=7 according to the DCI by using the above table, the terminal needs to use PUSCH mapping type B in connection with transmitting the PUSCH, and needs to transmit the PUSCH during eight OFDM symbols, starting from the fourth OFDM symbol, of the slot next to the slot through which the DCI has been transmitted. However, according to the above method, the terminal may fail to transmit data through the PUSCH, due to the minimum processing time of the terminal, according to the position or the CORESET to which the DCI is mapped, or the S value. Therefore, the minimum processing time of the terminal, the timing advance, and the like need to be considered in connection with defining Table 2 above or assigning the default time-domain resource.

In the NR system, the minimum processing time needed by the terminal to receive DCI and to prepare PUSCH transmission is defined as Table 3 below:

TABLE 3

| Units | 15 KHz SCS | 30 KHz SCS | 60 KHz SCS | 120 KHz SCS |
|---|---|---|---|---|
| Symbols | 10 | 12 | 23 | 36 |

It may be assumed that, if data is mapped to part or all of the first symbol of the PUSCH in Table 3 above, each value indicating the symbol in Table 3 above will be increased by one. In addition, the minimum processing time in Table 3 above may be differently assumed depending on the capability of the terminal.

Figure 4:
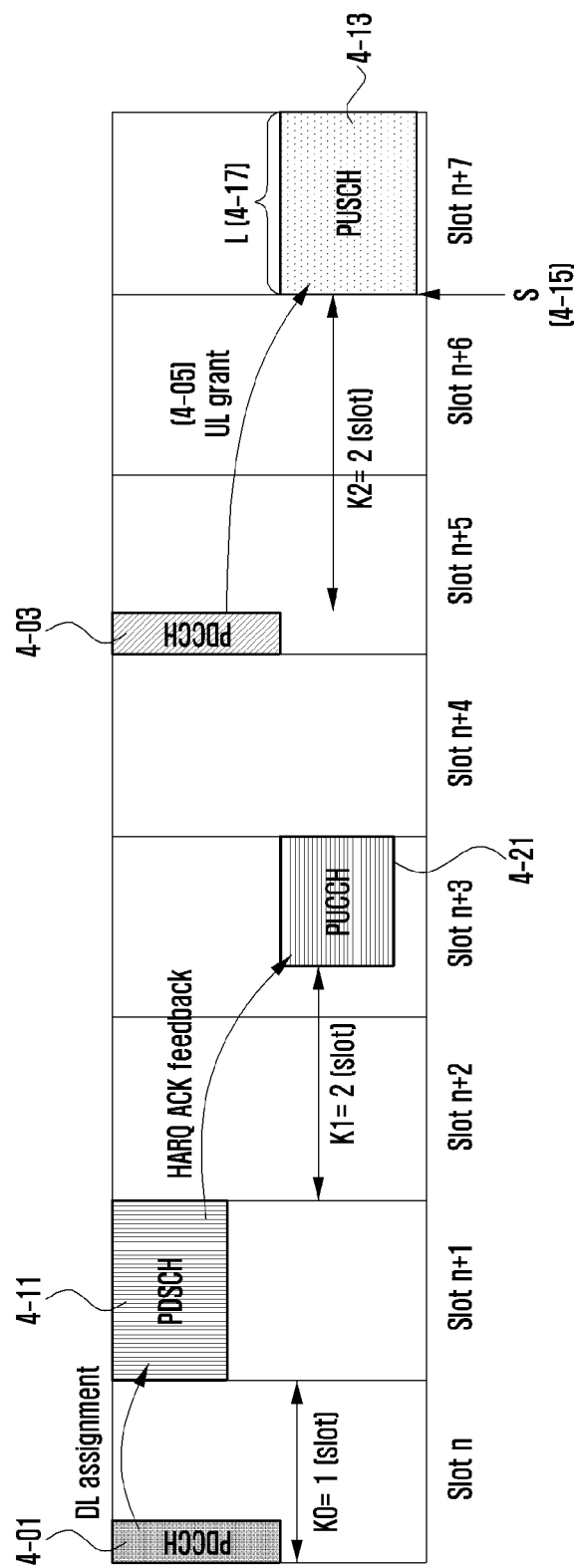
FIG. 4 illustrates an example of control information and data transmission timing in an NR system according to an embodiment of the disclosure.

FIG. 4 illustrates an example of scheduling timing and processing time. A PDCCH 4-01 transmitted in slot n may schedule a PDSCH 4-11 transmitted in the next slot. Assuming that the difference in index between the slot to transmit the PDCCH that schedules the PDSCH and the slot to transmit the PDSCH is K0, K0=1 in the above case. Meanwhile, a HARQ-ACK feedback regarding the PDSCH may be transmitted to a PUCCH 4-21 in slot n+3. Assuming that the difference in index between the slot to transmit the PDSCH and the slot to transmit the PUCCH including HARQ-ACK information of the corresponding PDSCH is K1, K1=2 in the above case. In addition, a PDCCH is transmitted (4-03) in slot n+5, and the PDCCH 4-03 may include information for scheduling a PUSCH 4-13 transmitted in slot n+7. Assuming that the difference in index between the slot to transmit the PDCCH that schedules the PUSCH and the slot to transmit the PUSCH is K2, K2=2 in the above case. In addition, in the illustrated example, the PUSCH in slot n+7 starts at the first symbol of the corresponding slot, and the length corresponds to 14 symbols. In this case, the position of the start symbol (S) is 0 (4-15), length L is 14 (4-17), and the information may be delivered to the terminal through the PDCCH 4-03. The time difference between the timepoint at which PDCCH transmission 4-03 ends and the timepoint at which transmission of the PUSCH 4-13 starts needs to be larger than the minimum processing time required by the terminal or the sum of the minimum processing time and the timing advanced value, or needs to be larger than or equal to the same.

Figure 5:
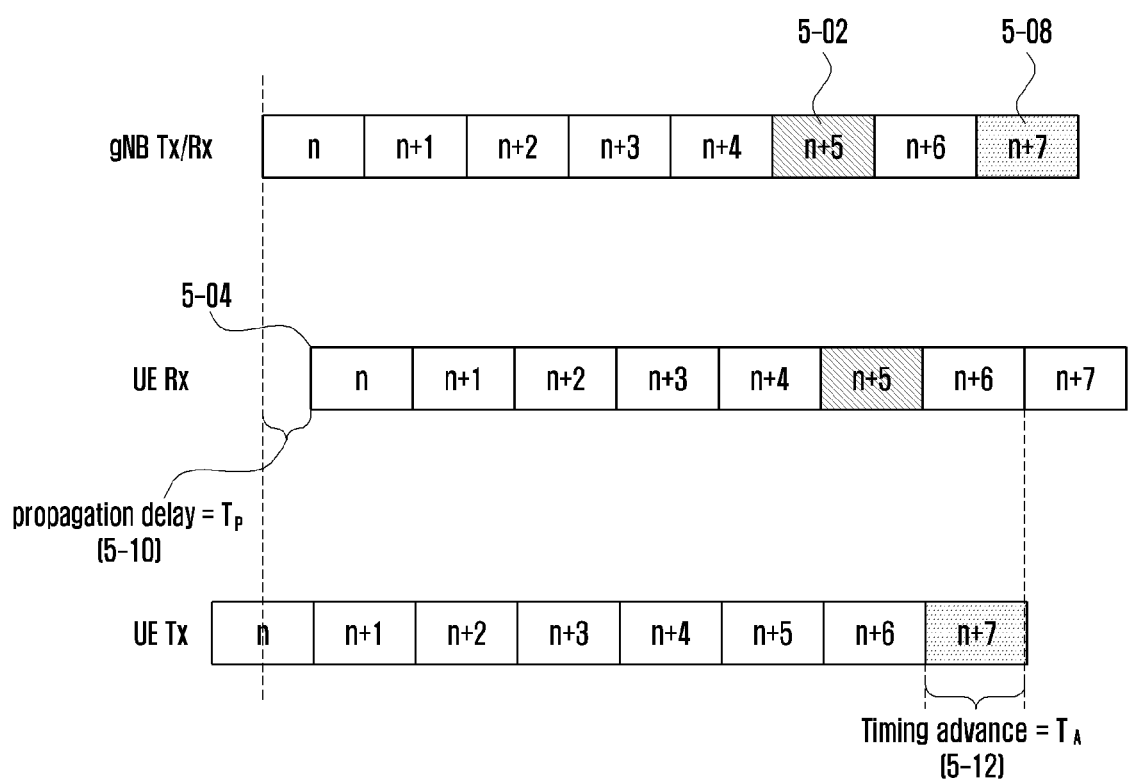
FIG. 5 is a diagram illustrating an example of timing advance in an NR system according to an embodiment of the disclosure.

FIG. 5 is a diagram for describing the timing advance. Assuming that the base station has transmitted a PDCCH (5-02) in slot n+5, an additional delay time exists until the same is delivered to the terminal (5-10). The delay time may be equal to or longer than the radio transmission time. During uplink transmission, the terminal needs to additionally consider the delay time 5-10 such that the time of delivery to the base station becomes identical to that of other terminals. Therefore, the terminal needs to configure, as a reference time, a timepoint preceding the reference time of the slot transmitted thereto through the downlink, and then make uplink transmission. Such a process of the terminal advancing the timing in order to make a transmission at a reference time preceding the downlink reference time may be referred to as a timing advance (5-12). The amount of timing advanced for the timing advance may be delivered by the base station to the terminal and then adjusted.

Hereinafter, a "case in which a default CORESET is positioned at the foremost part (or front side) of a slot" or a "case in which a CORESET exists from the first symbol in a slot", as used herein, may correspond to a case in which the position of the start symbol of a CORESET including a PDCCH that schedules a PUSCH or PDSCH is the first symbol of a slot, or starts from a predetermined value or less. Alternatively, the same may correspond to a case in which the position of the end symbol of a CORESET including a PDCCH that schedules a PUSCH or PDSCH comes before the seventh symbol of the slot, or the CORESET ends before a predetermined OFDM symbol in the slot. The predetermined value or less may be a determined value. For example, the CORESET may be positioned within the first two symbols of the slot, but such a value is not limiting in any manner. In addition, the DCI included in the CORESET may explicitly or implicitly indicate a case in which the CORESET is positioned at the foremost part of the slot.

Hereinafter, a "case in which a default CORESET is positioned in the middle of a slot", a "case in which a CORESET exists from the seventh symbol in a slot", or a "case in which the same is positioned on the rear side of a slot", as used herein, may correspond to a case in which the position of the start symbol of a CORESET including a PDCCH that schedules a PUSCH or PDSCH is the seventh symbol of a slot or later, or starts from a predetermined value or higher. Alternatively, the same may correspond to a case in which the position of the end symbol of a CORESET including a PDCCH that schedules a PUSCH or PDSCH comes after the seventh symbol of the slot, or the CORESET ends after a predetermined OFDM symbol in the slot. The predetermined value or less may be a determined value. For example, the CORESET may not be positioned within the first two symbols of the slot, or the CORESET may end within the last two symbols of the slot, but such a value is not limiting in any manner. In addition, the DCI included in the CORESET may explicitly or implicitly indicate a case in which the CORESET is positioned in the middle (or rear side) of the slot.

Meanwhile, it has been assumed in the above description that the fourth symbol of the slot is an exemplary reference for identifying that the position of the CORESET corresponds to the front part (or front side) of the slot or the middle (or rear side) of the slot, any other symbol included in the slot can be used as a reference to identify the position of the CORESET. In addition, the reference symbol to identify the position of the CORESET may be determined in view of the processing time of the terminal.

First Embodiment

The first embodiment provides a method and an apparatus wherein at least one table having values for default time-domain resource assignment is defined, a terminal selects tables having different values according to the information of a master information block (MIB), and default time-domain resource assignment for PUSCH transmission is thereby determined.

The terminal may perform control information monitoring in a CORESET for identifying system information (remaining system information (RMSI) and other system information (OSI)) or random access information, in a resource domain referred to as a PDCCH monitoring occasions for Type0-PDCCH common search space or the like. Alternatively, a resource domain in which the terminal monitors the PDCCH may be determined according to a separate configuration. A default time-domain resource for uplink data or PUSCH transmission is assigned before RRC connection in the PDCCH monitored by the terminal, and the position of the CORESET including the PDCCH may be indicated or configured by pieces of information referred to as MIB, RMSI, or OSI. The resource domain of the CORESET may also be changed according to a search space configuration.

According to a value indicated by a time-domain resource assignment bit value i in the DCI that schedules the PUSCH, the position of the time-domain resource of the PUSCH may be determined by using the following table. If the default CORESET is positioned at the foremost part (or front side) of a slot, that is, if a CORESET exists from the first or second symbol of a slot, for example, and if a PDCCH that schedules a PUSCH has been transmitted in the corresponding CORESET, the baes station may determine a default time-domain resource by using Table 4 below (default time-domain resource assignment table A), and the terminal may determine a default time-domain resource by using Table 4 below:

TABLE 4

| i | PUSCH mapping type | $K_2$ | S | L |
|---|---|---|---|---|
| 0 | Type A | j | 0 | 14 |
| 1 | Type A | j | 0 | 12 |
| 2 | Type B | j | 2 | 12 |
| 3 | Type B | j | 2 | 10 |
| 4 | Type B | j | 4 | 10 |
| 5 | Type B | j | 4 | 8 |
| 6 | Type A | j + 1 | 0 | 14 |
| 7 | Type A | j + 2 | 0 | 14 |

On the other hand, if the default CORESET is positioned in the middle (or back side) of the slot, that is, if the CORESET exists from the seventh symbol of the slot, for example, and a PDCCH that schedules a PUSCH has been transmitted in the corresponding CORESET, the baes station may determine a default time-domain resource by using Table 5 below (default time-domain resource assignment table B), and the terminal may determine a default time-domain resource by using Table 5 below:

TABLE 5

| i | PUSCH mapping type | $K_2$ | S | L |
|---|---|---|---|---|
| 0 | Type A | j + 1 | 0 | 14 |
| 1 | Type A | j + 1 | 0 | 12 |
| 2 | Type B | j + 1 | 2 | 12 |
| 3 | Type B | j + 1 | 2 | 10 |
| 4 | Type B | j + 1 | 4 | 10 |
| 5 | Type B | j + 1 | 4 | 8 |
| 6 | Type A | j + 2 | 0 | 14 |
| 7 | Type A | j + 3 | 0 | 14 |

A comparison between Table 5 and Table 4 shows that the PUSCH transmission timepoint provided in Table 5 generally comes after the PUSCH transmission timepoint provided in Table 4. This is because the PDCCH that schedules the PUSCH in a case corresponding to Table 5 is transmitter later than the PDCCH that schedules the PUSCH in a case corresponding to Table 4.

Table 6 below (default time-domain resource assignment Table B-2) may be applied in place of Table 5 above.

TABLE 6

| i | PUSCH mapping type | $K_2$ | S | L |
|---|---|---|---|---|
| 0 | Type B | j | 7 | 7 |
| 1 | Type B | j | 7 | 5 |
| 2 | Type B | j + 1 | 2 | 12 |
| 3 | Type B | j + 1 | 2 | 10 |
| 4 | Type A | j + 1 | 0 | 14 |
| 5 | Type A | j + 1 | 0 | 12 |
| 6 | Type A | j + 2 | 0 | 14 |
| 7 | Type A | j + 3 | 0 | 14 |

Although tables having specific values have been provided in the above for convenience of descriptions, values in the tables are not limited to the described examples, and may be variously modified and applied.

Figure 6:
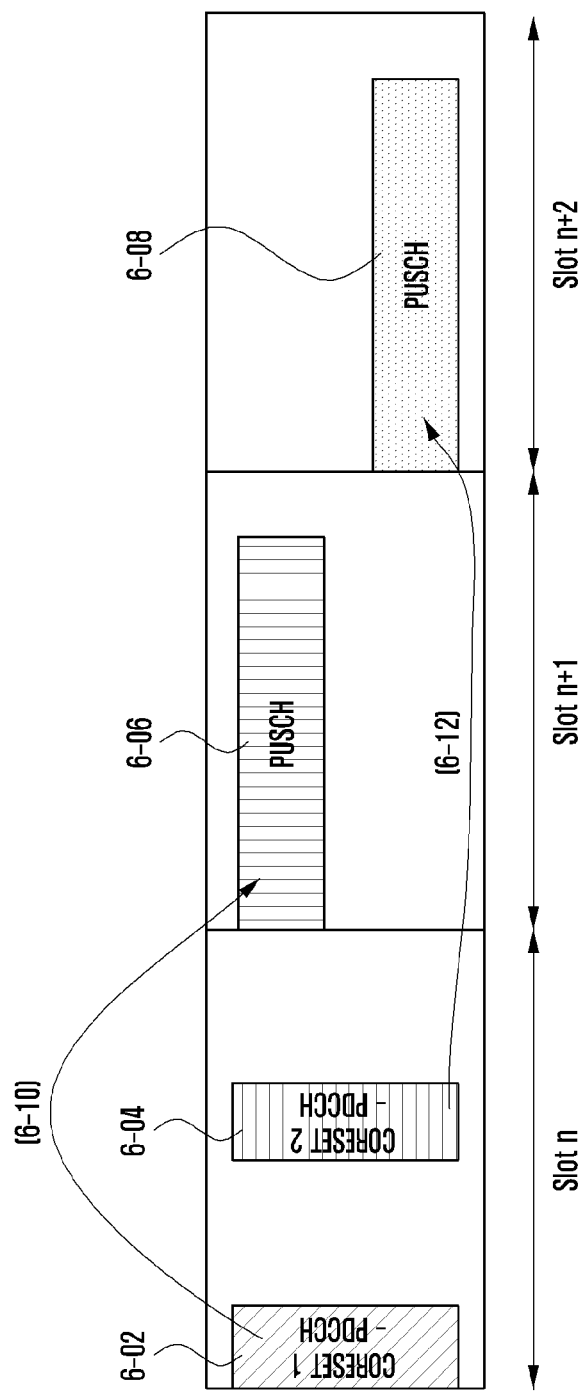
FIG. 6 is a diagram illustrating an example of scheduling a PUSCH in different CORESET positions in an NR system according to a first embodiment of the disclosure.

FIG. 6 is a diagram illustrating an example regarding CORESET positions and PUSCH scheduling. When PDCCHs for PUSCH scheduling are transmitted in CORESET 1 positioned at 6-02 and CORESET 2 positioned at 6-04, respectively, time-domain resource assignment delivered in the corresponding PDCCH may use a different default time-domain resource assignment table. For example, in connection with scheduling the PUSCH 6-06, time-domain resource assignment may be made by using Table 4 above, because CORESET 1 6-02 is positioned foremost in slot n. On the other hand, in connection with scheduling the PUSCH 6-08, time-domain resource assignment may be made by using Table 5 or 6 above, because CORESET 2 6-04 is positioned from the middle of slot n.

Figure 7:
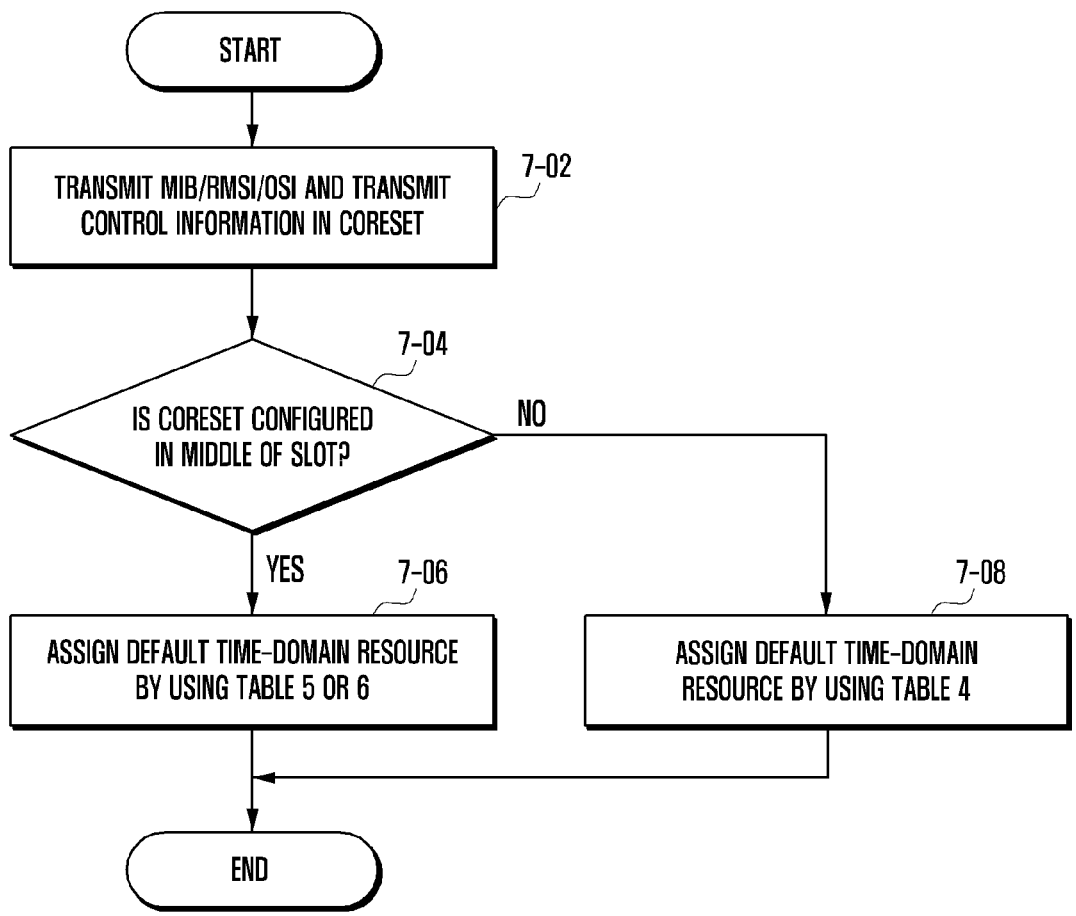
FIG. 7 is a flowchart illustrating a method for using a different table in connection with default time-domain assignment according to the position of a CORESET in an NR system according to a first embodiment of the disclosure.
Figure 8:
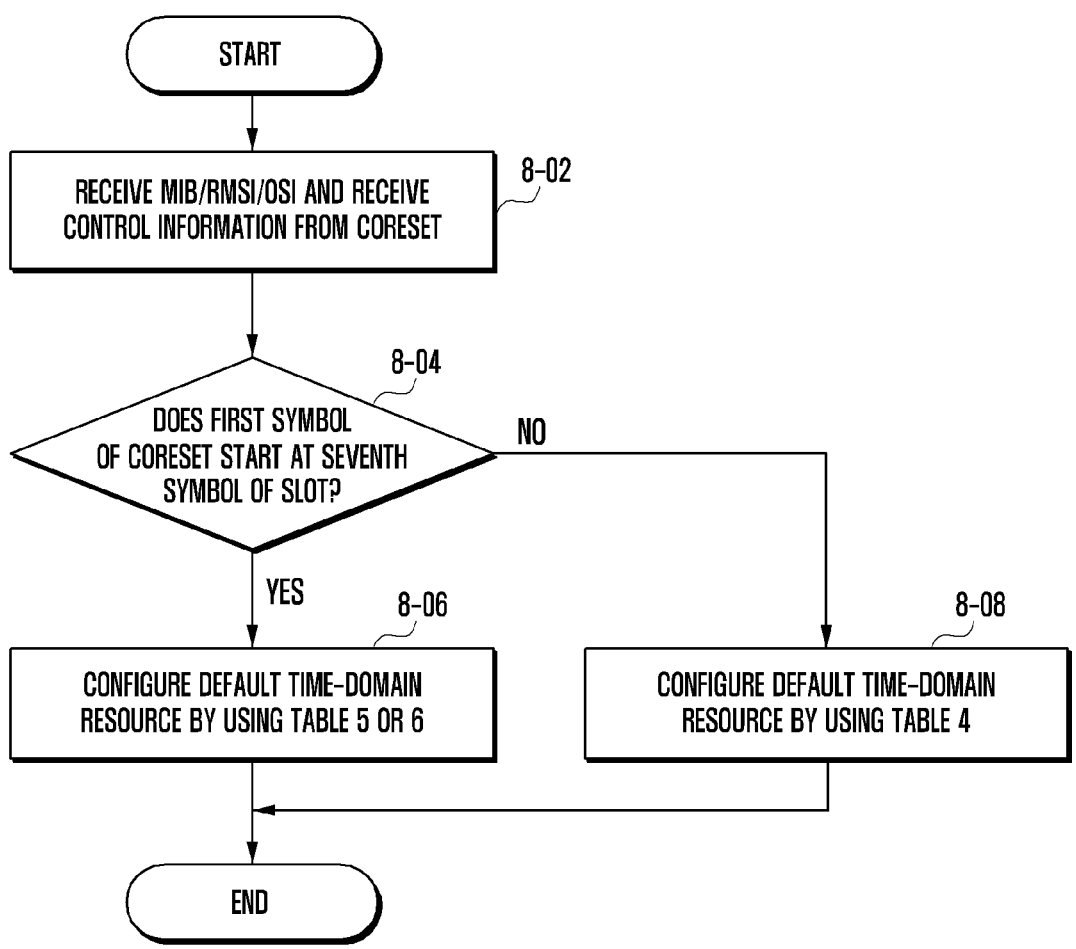
FIG. 8 is a flowchart illustrating a method for using a different table in connection with default time-domain assignment according to the position of a CORESET in an NR system according to a first embodiment of the disclosure.

FIG. 7 and FIG. 8 are diagrams illustrating operations of a base station and a terminal according to the first embodiment described above. FIG. 7 illustrates operations of a base station using a different table in a default time-domain resource configuration process according to the resource domain position of a CORESET, and FIG. 8 illustrates operations of a terminal using a different table in a default time-domain resource configuration process according to the resource domain position of a CORESET.

First, in FIG. 7, the base station transmits MIB/RMS/OSI and transmits control information in a CORESET in a position indicated by the MIB/RMSI/OSI to the terminal. The base station may assign a default time-domain resource to the terminal in a different scheme according to whether or not the CORESET is configured in the middle of the slot. For example, in the case of a CORESET configured in the middle (or rear side) of the slot (7-04), the base station may assign a default time-domain resource to the terminal by using Table 5 or 6 (7-06). In addition, if the CORESET is not configured in the middle (or rear side) of the slot (7-04), that is, if the position of the CORESET corresponds to the front side of the slot, the base station may assign a default time-domain resource to the terminal by using Table 4 (7-08).

In FIG. 8, the terminal receives the MIB/RMS/OSI and receives control information from the CORESET in the position indicated by the MIB/RMS/OSI (8-02). The terminal then identifies whether or not the CORESET from which the control information has been received is configured in the middle of the slot (8-04). According to the CORESET position of the corresponding slot or the PDCCH position thereof, or according to whether or not the first symbol of the CORESET starts from the seventh symbol of the slot (8-04), the terminal may use a different table so as to configure a default time-domain resource and transmit a PUSCH. For example, if the CORESET is configured in the middle (or rear side) of the slot or starts from the seventh symbol of the slot (8-04), the terminal may use Table 5 or 6 described above so as to configure a default time-domain resource and transmit an uplink signal through the PUSCH. On the other hand, if the CORESET is not configured in the middle (or rear side) of the slot or does not start from the seventh symbol of the slot (8-04), that is, if the position of the CORESET corresponds to the front side of the slot, the terminal may use Table 4 so as to configure a default time-domain resource and transmit an uplink signal through the PUSCH (8-08). That is, the terminal and the base station may use a different table, based on the position of the CORESET, so as to assign and configure the default time-domain resource.

Information regarding Table 4, Table 5, and Table 6 above in this embodiment may be predetermined, but may be delivered from the base station to the terminal by using system information such as RMSI or OSI. In this case, the terminal receives the RMSI or OSI and then identifies information regarding Table 4, Table 5, and Table 6. Meanwhile, before a RRC configuration is made for the corresponding terminal, the terminal may determine the PUSCH transmission timepoint according to the position of the CORESET that schedules the PUSCH, assuming Table 4/Table 5/Table 6 above.

Second Embodiment

The second embodiment provides a method and an apparatus wherein a table having values for default time-domain resource assignment is defined, a terminal adds a predetermined offset value to K2 value according to information of MIB, thereby driving actual K2 value, and this is used to determine default time-domain resource assignment for PUSCH transmission.

The terminal may perform control information monitoring in a CORESET for identifying system information (remaining system information (RMSI) and other system information (OSI)) or random access information, in a resource domain referred to as a PDCCH monitoring occasions for Type0-PDCCH common search space or the like. Alternatively, a resource domain in which the terminal monitors the PDCCH may be determined according to a separate configuration. A default time-domain resource for uplink data or PUSCH transmission is assigned before RRC connection in the PDCCH monitored by the terminal, and the position of the CORESET including the PDCCH may be indicated or configured by pieces of information referred to as MIB, RMSI, or OSI. The resource domain of the CORESET may also be changed according to a search space configuration.

According to a value indicated by a time-domain resource assignment bit value i in the DCI that schedules the PUSCH, the position of the time-domain resource of the PUSCH may be determined by using the following table. According to whether the default CORESET is positioned at the foremost part (or front side) of a slot, that is, whether a CORESET exists from the first or second symbol of a slot, for example, or the CORESET exists from the seventh symbol of the slot, the baes station may assign a default time-domain resource by differently applying value a (that is, offset) in Table 7 below when a PDCCH that schedules a PUSCH has been transmitted in the corresponding CORESET, and the terminal may determine a default time-domain resource by differently applying value a.

TABLE 7

| i | PUSCH mapping type | $K_2$ | S | L |
|---|---|---|---|---|
| 0 | Type A | j + a | 0 | 14 |
| 1 | Type A | j + a | 0 | 12 |
| 2 | Type A | j + a | 0 | 10 |
| 3 | Type B | j + a | 2 | 12 |
| 4 | Type B | j + a | 2 | 10 |
| 5 | Type B | j + a | 2 | 8 |
| 6 | Type B | j + a | 4 | 10 |
| 7 | Type B | j + a | 4 | 8 |
| 8 | Type B | j + a | 4 | 6 |
| 9 | Type B | j + a | 7 | 7 |
| 10 | Type A | j + a + 1 | 0 | 14 |
| 11 | Type A | j + a + 1 | 0 | 12 |
| 12 | Type A | j + a + 1 | 0 | 10 |
| 13 | Type A | j + a + 2 | 0 | 14 |
| 14 | Type A | j + a + 2 | 0 | 12 |
| 15 | Type A | j + a + 2 | 0 | 10 |

For example, if the default CORESET exists at the foremost part (or front side) of the slot, that is, if the CORESET exists from the first or second symbol of the slot, the terminal may assign the default time-domain resource by applying 0 as value a in Table 7 above. On the other hand, if the default CORESET exists in the middle (or rear side) of the slot, that is, if the CORESET exists from the seventh symbol of the slot, the terminal may assign the default time-domain resource by applying 1 as value a in Table 7 above.

Alternatively, as another example, it is possible to consider a method wherein Table 8 below is used, and value j in Table 8 is defined as in Table 9 below.

TABLE 8

| i | PUSCH mapping type | $K_2$ | S | L |
|---|---|---|---|---|
| 0 | Type A | j | 0 | 14 |
| 1 | Type A | j | 0 | 12 |
| 2 | Type A | j | 0 | 10 |
| 3 | Type B | j | 2 | 12 |
| 4 | Type B | j | 2 | 10 |
| 5 | Type B | j | 2 | 8 |
| 6 | Type B | j | 4 | 10 |
| 7 | Type B | j | 4 | 8 |
| 8 | Type B | j | 4 | 6 |
| 9 | Type B | j | 7 | 7 |
| 10 | Type A | j + 1 | 0 | 14 |
| 11 | Type A | j + 1 | 0 | 12 |
| 12 | Type A | j + 1 | 0 | 10 |
| 13 | Type A | j + 2 | 0 | 14 |
| 14 | Type A | j + 2 | 0 | 12 |
| 15 | Type A | j + 2 | 0 | 10 |

TABLE 9

| μ | j (if CORESET is position from slot start) | j (if CORESET is position from slot middle) |
|---|---|---|
| 0 | 1 | 2 |
| 1 | 1 | 2 |
| 2 | 2 | 3 |
| 3 | 3 | 4 |

Value of μ in Table 9 above, 0, 1, 2, and 3, may correspond to cases in which the subcarrier spacing is 15 kHz, 30 kHz, 60 kHz, and 120 kHz, respectively. Information regarding Table 7, Table 8, and Table 9 above in this embodiment may be predetermined, but may be delivered from the base station to the terminal by using system information such as RMSI or OSI. In this case, the terminal receives the RMSI or OSI and then identifies information regarding Table 7, Table 8, and Table 9. Meanwhile, before a RRC configuration is made for the corresponding terminal, the terminal may determine the PUSCH transmission timepoint according to the position of the CORESET that schedules the PUSCH, assuming the above tables.

Although tables having specific values have been provided in the above for convenience of descriptions, values in the tables are not limited to the described examples, and may be variously modified and applied.

Third Embodiment

The third embodiment provides a method and an apparatus wherein a table having values for default time-domain resource assignment is defined, and a terminal differently selects a set of rows in the table according to information of MIB and regards the selected set as a candidate, thereby determining default time-domain resource assignment for PUSCH transmission in DCI.

The terminal may perform control information monitoring in a CORESET for identifying system information (remaining system information (RMSI) and other system information (OSI)) or random access information, in a resource domain referred to as a PDCCH monitoring occasions for Type0-PDCCH common search space or the like. Alternatively, a resource domain in which the terminal monitors the PDCCH may be determined according to a separate configuration. A default time-domain resource for uplink data or PUSCH transmission is assigned before RRC connection in the PDCCH monitored by the terminal, and the position of the CORESET including the PDCCH may be indicated or configured by pieces of information referred to as MIB, RMSI, or OSI. The resource domain of the CORESET may also be changed according to a search space configuration.

According to the time-domain resource assignment bit value i in DCI that schedules a PUSCH, the position of the time-domain resource of the PUSCH may be determined by using Table 10 below:

TABLE 10

| i | PUSCH mapping type | $K_2$ | S | L |
|---|---|---|---|---|
| 0* | Type A | j | 0 | 14 |
| 1* | Type A | j | 0 | 12 |
| 2* | Type A | j | 0 | 10 |
| 3* | Type B | j | 2 | 12 |
| 4* | Type B | j | 2 | 10 |
| 5* | Type B | j | 2 | 8 |
| 6* | Type B | j | 4 | 10 |
| 7* | Type B | j | 4 | 8 |
| 8* | Type B | j | 4 | 6 |
| 9 | Type B | j | 7 | 7 |
| 10 | Type A | j + 1 | 0 | 14 |
| 11 | Type A | j + 1 | 0 | 12 |
| 12 | Type A | j + 1 | 0 | 10 |
| 13 | Type A | j + 2 | 0 | 14 |
| 14 | Type A | j + 2 | 0 | 12 |
| 15 | Type A | j + 2 | 0 | 10 |
| 0** | Type A | j + 3 | 0 | 14 |
| 1** | Type A | j + 3 | 0 | 12 |
| 2** | Type A | j + 3 | 0 | 10 |
| 3** | Type B | j | 7 | 5 |
| 4** | Type B | j | 7 | 3 |
| 5** | Type B | j + 1 | 2 | 12 |
| 6** | Type B | j + 1 | 2 | 10 |
| 7** | Type B | j + 1 | 2 | 8 |
| 8** | Type B | j | 4 | 10 |

In Table 10 above, parts marked by * may correspond to rows applied when the default CORESET is positioned at the foremost part (or rear side) of the slot, that is, when the CORESET exists from the first symbol of the slot. In addition, parts marked by ** in the above table may correspond to rows applied when the default CORESET is positioned in the middle (or rear side) of the slot, that is, when the CORESET exists from the seventh symbol of the slot. Information regarding Table 10 above in this embodiment may be predetermined, but may be delivered from the base station to the terminal by using system information such as RMSI or OSI. In this case, the terminal receives the RMSI or OSI and then identifies information regarding Table 10. Meanwhile, before a RRC configuration is made for the corresponding terminal, the terminal may determine the PUSCH transmission timepoint according to the position of the CORESET that schedules the PUSCH, assuming the above tables.

Although tables having specific values have been provided in the above for convenience of descriptions, values in the tables are not limited to the described examples, and may be variously modified and applied.

Hereinafter, above-described operations of the terminal and the base station according to the first to third embodiments will be described in more detail with reference to FIG. 9.

Figure 9:
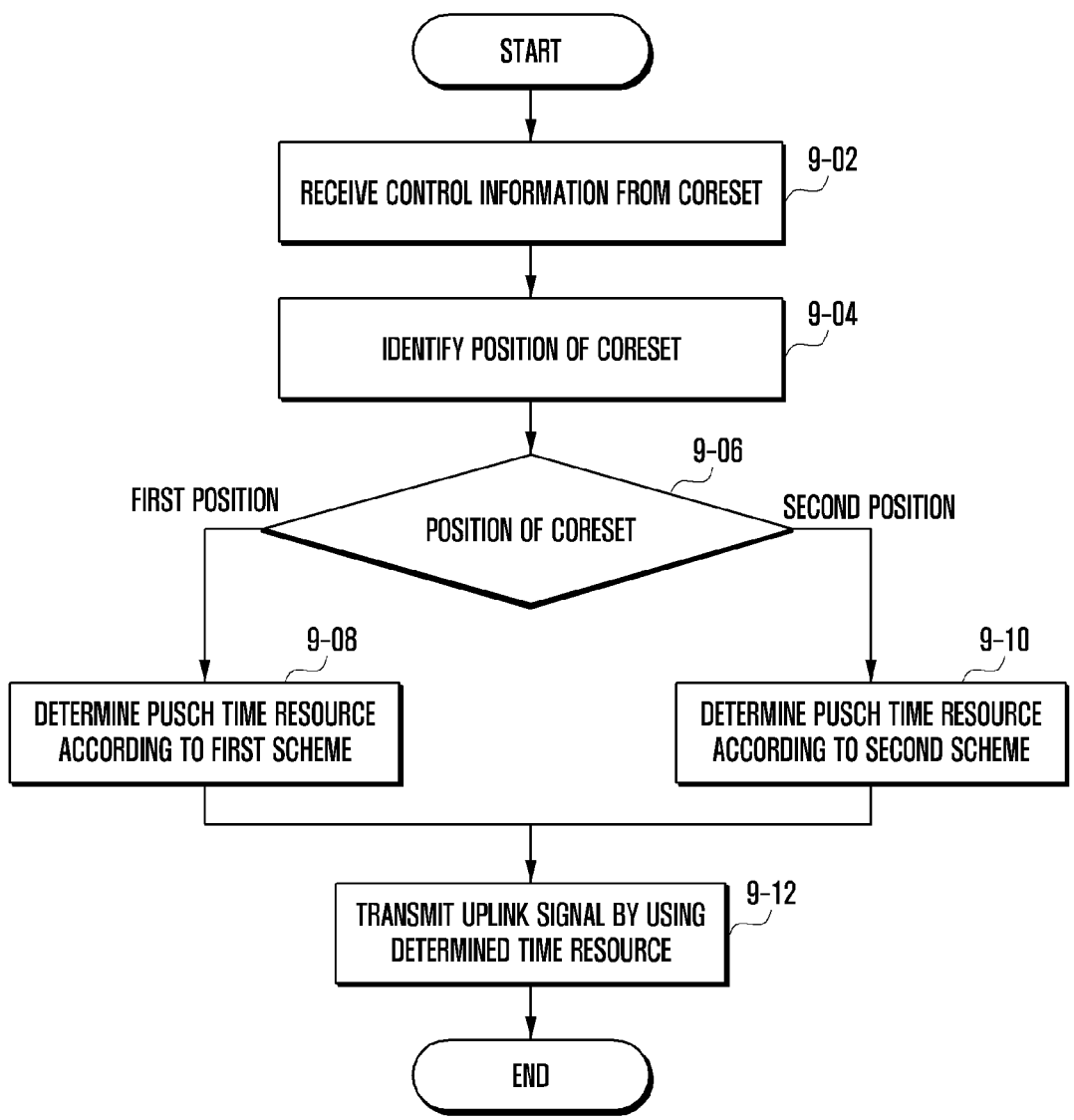
FIG. 9 is a flowchart illustrating a method wherein, in an NR system according to embodiments of the disclosure, a terminal transmits an uplink signal in a different scheme according to the position of a CORESET, and a base station receives the uplink signal.

FIG. 9 is a flowchart illustrating a method wherein, in an NR system according to embodiments of the disclosure, a terminal transmits an uplink signal in a different scheme according to the position of a CORESET, and a base station receives the uplink signal. In FIG. 9, the base station transmits control information through the CORESET, and the terminal receives control information that schedules a PUSCH from the CORESET received from the base station (9-02). The terminal identifies the position of the received CORESET (9-04), and determines whether the CORESET is positioned in a first position (the foremost part of the slot or the front side of the slot, described above) or in a second position (from the middle of the slot, or on the rear side thereof, described above) (9-06).

If the CORESET that schedules the PUSCH is positioned in the first position of the slot, the terminal determines a time resource set for PUSCH transmission according to a first scheme, and determines a time resource based on control information in the time resource set (9-08). The first scheme may refer to at least one of the scheme of determining the PUSCH transmission timepoint according to Table 4, among the above-described embodiments, the scheme of determining the PUSCH transmission timepoint by configuring value a in Table 7 as 0, the scheme of determining the PUSCH transmission timepoint by determining value j according to the left column in Table 8 and Table 9, and the scheme of determining the PUSCH transmission timepoint according to rows marked by * in Table 10. If the time resource set is determined based on the position of the CORESET according to at least one scheme among the above-described embodiments, the terminal may determine a time resource for PUSCH transmission within the corresponding time resource set based on the control information.

If the CORESET that schedules the PUSCH is positioned in the second position of the slot, the terminal determines a time resource set for PUSCH transmission according to the second scheme, and determines a time resource based on control information within the time resource set (9-10). The second scheme may refer to at least one of the scheme of determining the PUSCH transmission timepoint according to Table 5 and Table 6, among the above-described embodiments, the scheme of determining the PUSCH transmission timepoint by configuring value a in Table 7 as a value equal to/larger than 1, the scheme of determining the PUSCH transmission timepoint by determining value j according to the right column in Table 8 and Table 9, and the scheme of determining the PUSCH transmission timepoint according to rows marked by ** in Table 10. If the time resource set is determined based on the position of the CORESET according to at least one scheme among the above-described embodiments, the terminal may determine a time resource for PUSCH transmission within the corresponding time resource set based on the control information.

The terminal determines a time resource according to the control information based on the time resource set determined according to the first or second scheme, and transmits an uplink signal to the base station through the PUSCH of the determined time resource. Meanwhile, the base station may receive the uplink signal from the terminal through the PUSCH of the corresponding time resource (9-12).

Meanwhile, it has been assumed in the above description of embodiments that the base station determines a time resource set according to the position of the CORESET that schedules the PUSCH, and the terminal determines the PUSCH transmission timepoint by using the time resource set. It is obvious that the above-described embodiments are applicable, in the same or similar sense, to a process in which the base station determines a time resource set necessary for the terminal to determine the timepoint to receive the PDSCH according to the position of the CORESET that schedules the PDSCH, and determine a PDSCH reception time resource by using the corresponding set.

Figure 10:
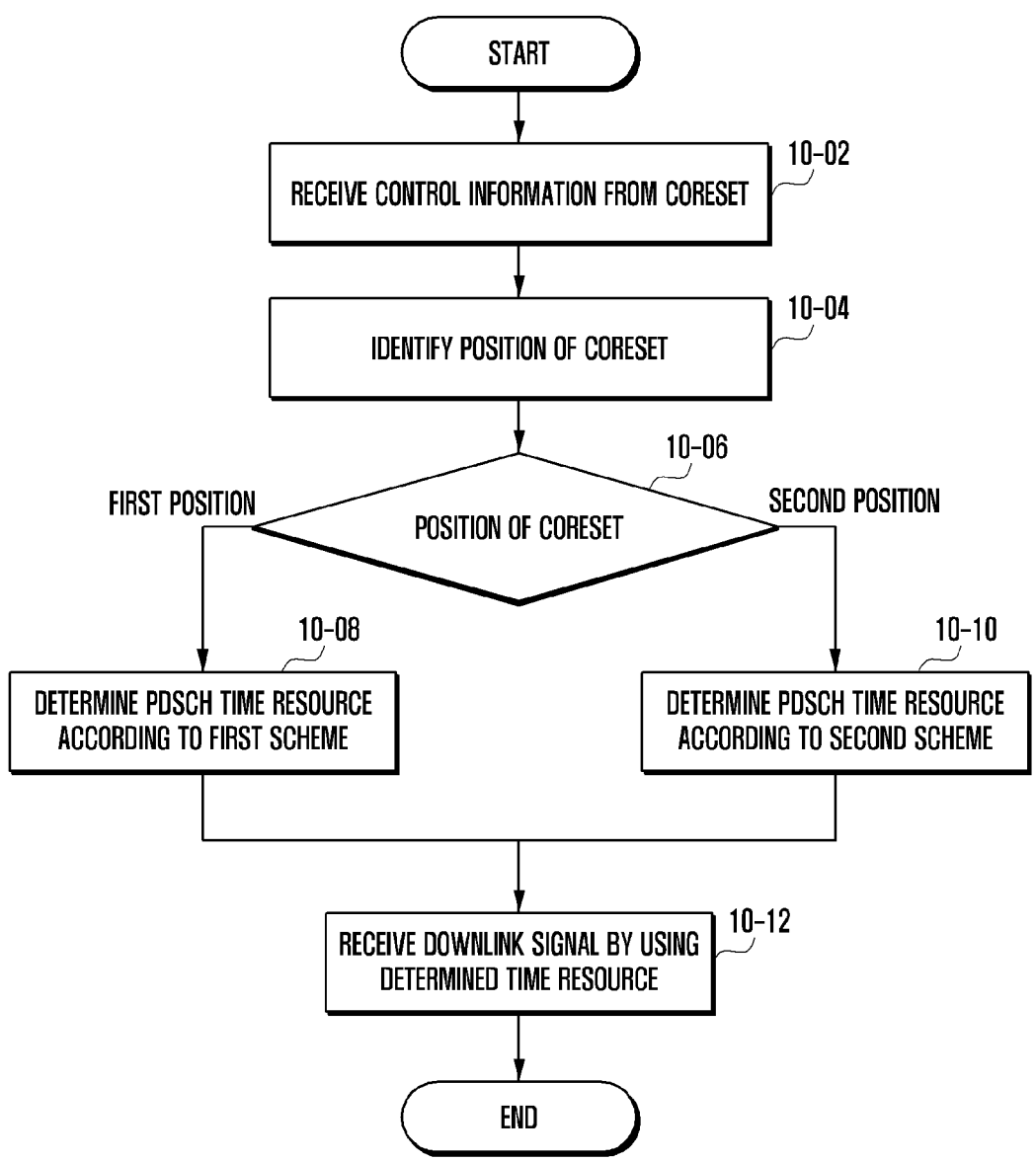
FIG. 10 is a flowchart illustrating a method wherein, in an NR system according to embodiments of the disclosure, a terminal receives a downlink signal in a different scheme according to the position of a CORESET, and a base station transmits the downlink signal.

For example, FIG. 10 is a flowchart illustrating a method wherein, in an NR system according to embodiments of the disclosure, a terminal receives a downlink signal in a different scheme according to the position of a CORESET, and a base station transmits a downlink signal.

In FIG. 10, the base station transmits control information through the CORESET, and the terminal receives control information that schedules a PUSCH from the CORESET received from the base station (10-02). The terminal identifies the position of the received CORESET (10-04), and determines whether the CORESET is positioned in a first position (the foremost part of the slot or the front side of the slot, described above) or in a second position (from the middle of the slot, or on the rear side thereof, described above) (10-06).

If the CORESET that schedules the PDSCH is positioned in the first position of the slot, the terminal determines a time resource set for PDSCH reception according to a first scheme, and determines a time resource based on control information in the time resource set (10-08). The first scheme may refer to at least one of the scheme of determining the PDSCH reception timepoint according to a table defined regarding the PDSCH similarly to Table 4, among the above-described embodiments, the scheme of determining the PDSCH reception timepoint by configuring value a as 0 according to a table defined regarding the PDSCH similarly to Table 7, the scheme of determining the PDSCH reception timepoint by determining value j according to the left column according to a table defined regarding the PDSCH similarly to Table 8 and Table 9, and the scheme of determining the PDSCH reception timepoint according to rows marked by * according to a table defined regarding the PDSCH similarly to Table 10. If the time resource set is determined based on the position of the CORESET according to at least one scheme among the above-described embodiments, the terminal may determine a time resource for PDSCH reception within the corresponding time resource set based on the control information.

If the CORESET that schedules the PDSCH is positioned in the second position of the slot, the terminal determines a time resource set for PDSCH transmission according to a second scheme, and determines a time resource based on control information in the time resource set (10-10). The second scheme may refer to at least one of the scheme of determining the PDSCH transmission timepoint according to a table defined regarding the PDSCH similarly to Table 5 and Table 6, among the above-described embodiments, the scheme of determining the PDSCH reception timepoint by configuring value a as a value equal to/larger than 1 according to a table defined regarding the PDSCH similarly to Table 7, the scheme of determining the PDSCH reception timepoint by determining value j according to the right column according to a table defined regarding the PDSCH similarly to Table 8 and Table 9, and the scheme of determining the PDSCH reception timepoint according to rows marked by ** according to a table defined regarding the PDSCH similarly to Table 10. If the time resource set is determined based on the position of the CORESET according to at least one scheme among the above-described embodiments, the terminal may determine a time resource for PDSCH reception within the corresponding time resource set based on the control information.

The terminal determines a time resource according to the control information based on the time resource set determined according to the first or second scheme, and receives a downlink signal from the base station through the PDSCH of the determined time resource. Meanwhile, the base station may transmit the downlink signal to the terminal through the PDSCH of the corresponding time resource (10-12).

Figure 11:
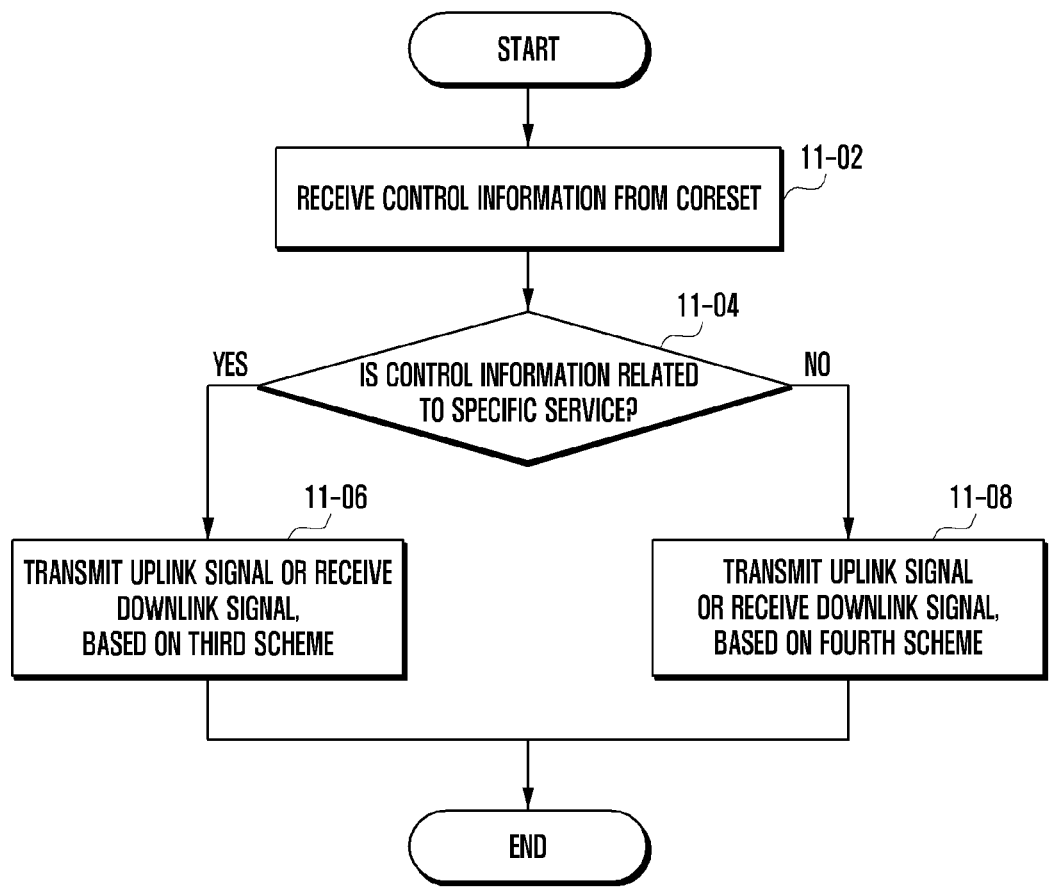
FIG. 11 is a flowchart illustrating a method wherein, in an NR system according to embodiments of the disclosure, a terminal transmits an uplink signal or receives a downlink signal in a different scheme in connection with a specific service.

FIG. 11 is a flowchart illustrating a method wherein, in connection with a specific service in an NR system according to embodiments of the disclosure, a terminal transmits an uplink signal or receives a downlink signal in a different scheme. The above-described embodiments are applicable not only to overall NR systems, but also in a service-specific manner (for example, to URLLC service).

For example, in FIG. 11, if the terminal receives control information that schedules a PUSCH or a PDSCH from a base station through a CORESET (11-02), the terminal identifies whether or not the control information is related to a specific service (11-04). By identifying the value of a specific field or the value of an indicator included in the control information, the terminal may determine whether the control information schedules a PUSCH or a PDSCH related to a specific service.

Alternatively, the same may be distinguished by an ID value or RNTI value masked at the CRC of the control information that schedules the PDSCH or PUSCH. This will now be described in detail with reference to FIG. 12, for example.

Figure 12:
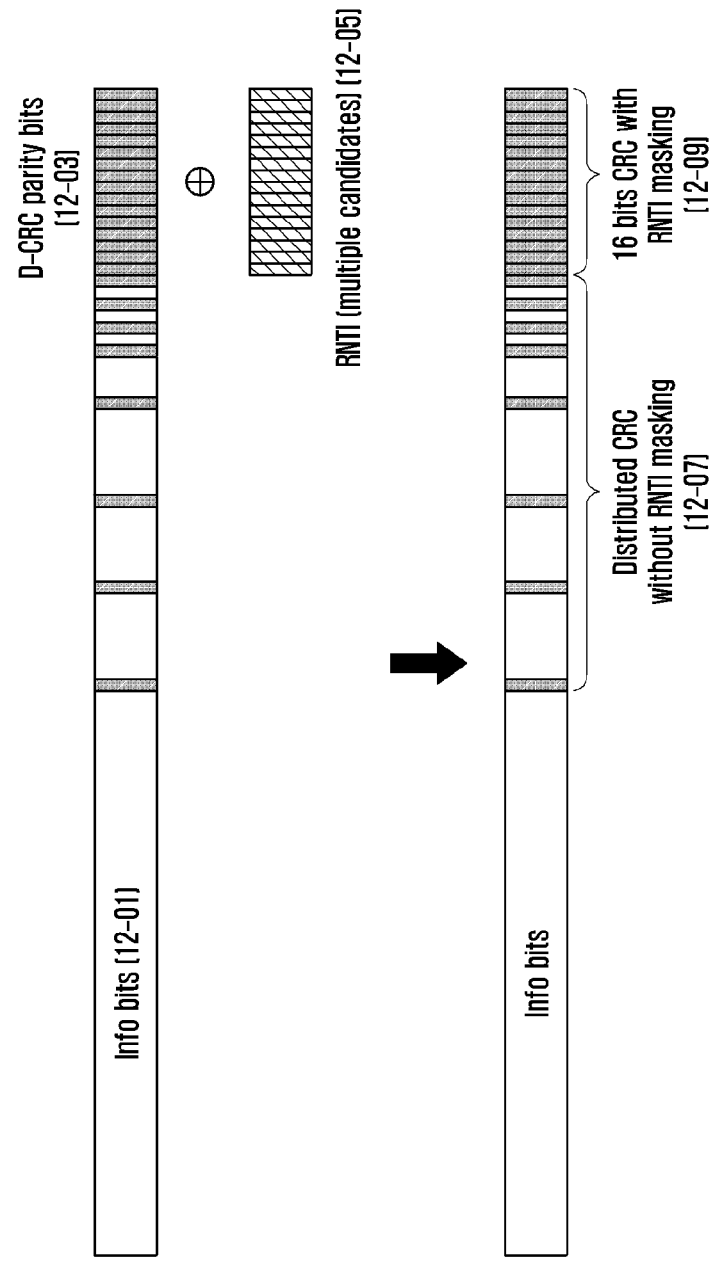
FIG. 12 is a diagram illustrating an example of masking an RNTI having a 16-bit length on a part of a CRC added to DCI in an NR system.

FIG. 12 is a diagram illustrating an example of making an RNTI having a 16-bit length on a part of a CRC added to DCI in an NR system. Referring to FIG. 12, in the NR system, a 24-bit CRC 12-03 may be added to DCI information bits 12-01, and a 16-bit RNTI 12-05 may be masked on a partial CRC 12-09. According to some embodiments, a total of 24 bits of CRC 12-03 may be added to DCI information bits 12-01, a partial CRC 12-07 among the 24-bit CRC 12-03 may be added in the middle of the DCI information bits 12-01, and the remaining CRC 12-09 may be added to the last part of the DCI information bits 12-01. An RNTI value configured for the terminal or pre-known to the terminal may be masked on the 16-bit CRC 12-09 added to the last part of the DCI information bits 12-01 among the added CRC. As used herein, "masking" means that bit values in the same position undergo XOR operation with each other, which may become 0 if the two bit values are identical, or become 1 if they are different. Front 8-bit CRC 12-07 added in the middle of the DCI information bits 12-01 among the added CRC may not undergo masking with the value of RNTI or the like. After the CRC is added to the DCI information bits in this manner, and after the RNTI is masked on a part of the added CRC, control information may be transmitted by performing channel coding through a polar code. According to some embodiments, the receiving end may, after decoding using a polar code of received control information, re-perform masking of an RNTI value known to the receiving end or configured therefor at the part of the CRC added to the DCI information bits, at which the RNTI is masked, or may perform an operation of releasing the masking, thereby performing CRC check and determining whether or not DCI is detected.

According to the embodiment described with reference to FIG. 12, the terminal may determine, based on the ID or RNTI value masked at the CRC of received control information, whether the corresponding control information schedules a PUSCH or PDSCH related to a specific service.

Alternatively, the terminal may implicitly recognize that the control information is related to a specific service by identifying that the length of the time resource of the PDSCH or PUSCH scheduled by the control information corresponds to a mini-slot including less than 14 OFDM symbols.

If it is determined according to the above-mentioned process that the control information is related to a specific service, the terminal may determine a PUSCH transmission timepoint based on a third scheme and transmit an uplink signal, or may determine a PDSCH reception timepoint and receive a downlink signal (11-06). The third scheme described with reference to FIG. 11 refers to a scheme of differently determining the PUSCH transmission timepoint or PDSCH reception timepoint, based on the position of the CORESET, according to the above-descried first to third embodiments. That is, the third scheme refers to a scheme of determining the PUSCH transmission timepoint or PDSCH transmission timepoint by differently interpreting the time-domain resource, based on whether the CORESET is positioned at the front part (or front side) in a slot or in the middle (or rear side), according to at least one of the above-described embodiments.

Meanwhile, if it is determined that the control information is not related to a specific service, the terminal may determine a PUSCH transmission timepoint based on a fourth scheme and transmit an uplink signal, or may determine a PDSCH reception timepoint and receive a downlink signal (11-08). The fourth scheme described with reference to FIG. 11 refers to a scheme of determining a PUSCH transmission timepoint and determining a PDSCH reception timepoint according to the above-described Table 2. That is, according to the fourth scheme, the terminal may determine a PUSCH transmission timepoint or a PDSCH transmission timepoint from a preconfigured table according to a value indicated from control information, regardless of the position of the CORESET.

Figure 13:
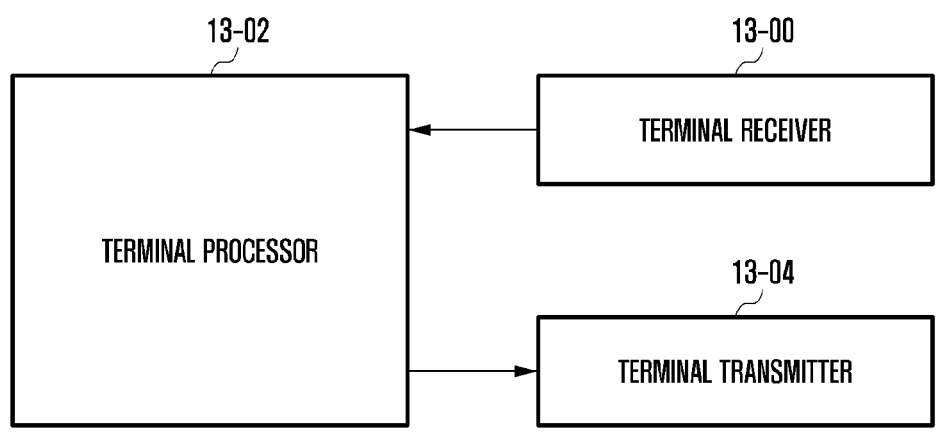
FIG. 13 is a diagram illustrating the internal structure of a terminal according to embodiments of the disclosure.
Figure 14:
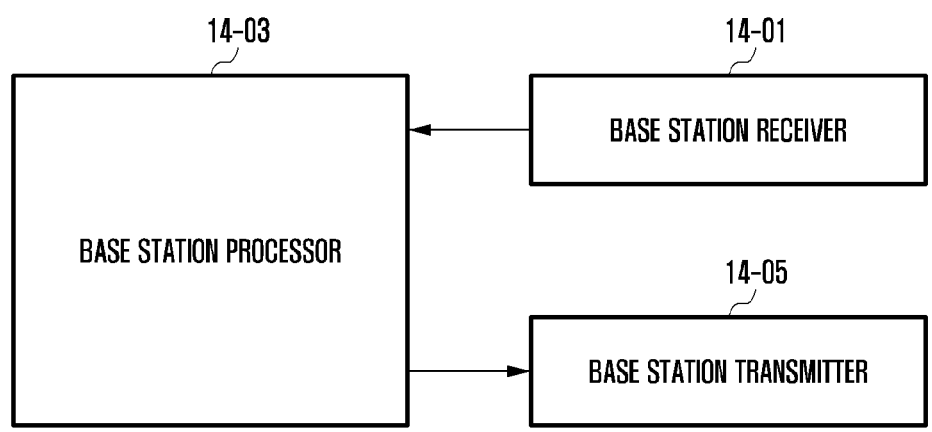
FIG. 14 is a diagram illustrating the internal structure of a base station according to embodiments of the disclosure.

Transmitters, receivers, and processors of a terminal and a base station for performing the above embodiments of the disclosure are illustrated in FIG. 13 and FIG. 14, respectively. A base station and a terminal performing operations of determining the position of a CORESET according to the first to third embodiments, determining time-domain resource assignment for PUSCH transmission, and transmitting/receiving a PUSCH and a PDSCH are illustrated in FIG. 13 and FIG. 14, and the receiver, processor, and transmitter of the base station and the terminal may operate according to respective embodiments.

Specifically, FIG. 13 is a block diagram illustrating the internal structure of a terminal according to an embodiment of the disclosure. As illustrated in FIG. 13, the terminal of the disclosure may include a terminal receiver 13-00, a terminal transmitter 13-04, and a terminal processor 13-02. The terminal receiver 13-00 and the terminal transmitter 13-04, as a whole, may be referred to as a transceiver in an embodiment of the disclosure. The transceiver may transmit/receive a signal with the base station. The signal may include control information and data. To this end, the transceiver may include an RF transmitter configured to up-convert and amplify the frequency of a transmitted signal, and an RF receiver configured to low-noise-amplify a received signal and down-convert the frequency thereof. In addition, the transceiver may receive a signal through a radio channel, output the same to the terminal processor 13-02, and transmit a signal output from the terminal processor 13-02 through the radio channel. The terminal processor 13-02 may control a series of processes such that the terminal can operate according to above-described embodiments of the disclosure. For example, the terminal receiver 13-00 may receive scheduling information from the base station, and the terminal processor 13-02 may determine a PUSCH or PDSCH time-domain resource according to the scheduled control information and the position of the CORESET in which the control information is included, and may perform transmission preparation and reception preparation accordingly. Thereafter, the terminal transmitter 13-04 may deliver the scheduled PUSCH to the base station. The terminal receiver 13-00 may receive the scheduled PDSCH form the base station.

FIG. 14 is a block diagram illustrating the internal structure of a base station according to an embodiment of the disclosure. As illustrated in FIG. 14, the base station of the disclosure may include a base station receiver 14-01, a base station transmitter 14-05, and a base station processor 14-03. The base station receiver 14-01 and the base station transmitter 14-05, as a whole, may be referred to as a transceiver in an embodiment of the disclosure. The transceiver may transmit/receive a signal with the terminal. The signal may include control information and data. To this end, the transceiver may include an RF transmitter configured to up-convert and amplify the frequency of a transmitted signal, and an RF receiver configured to low-noise-amplify a received signal and down-convert the frequency thereof. In addition, the transceiver may receive a signal through a radio channel, output the same to the base station processor 14-03, and transmit a signal output from the terminal processor 14-03 through the radio channel. The base station processor 14-03 may control a series of processes such that the base station can operate according to above-described embodiments of the disclosure. For example, the base station processor 14-03 may determine a table for a PUSCH or PDSCH time-domain resource according to the position of the CORESET in which control information is delivered, thereby determining control information. Thereafter, the base station transmitter 14-05 transmits related scheduling control information and transmits the PDSCH according to the scheduling information, and the base station receiver 14-01 receives the PUSCH from the terminal according to the scheduling information.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. Further, other variants of the above embodiments, based on the technical idea of the embodiments, may be implemented in the 5G system, the NR system, and the like.

The invention claimed is:

1. A method for communicating with a base station by a terminal in a wireless communication system, the method comprising:
  receiving, from the base station, downlink control information (DCI) comprising scheduling information through a control resource set (CORESET);
  determining a time resource set to which the scheduling information is to be applied between a first time resource table and a second time resource table, wherein one of the first time resource table or the second time resource table is selected based on a position of the CORESET in a slot; and
  communicating with the base station according to time domain resource allocation information indicated by the scheduling information in the determined time resource set,
  wherein the first time resource table and the second time resource table are separately configured,
  wherein the first time resource table is selected in case that the position of the CORESET precedes a position of predetermined symbol, and
  wherein the second time resource table is selected in case that the position of the CORESET follows the position of predetermined symbol.

2. The method of claim 1, wherein 1,
  the second time resource table has a timepoint coming after the first time resource table.

3. The method of claim 1, wherein the position of the CORESET is determined by a first or last symbol of the CORESET, and
  in the communicating with the base station, an uplink signal is transmitted to the base station through a physical uplink shared channel (PUSCH), or a downlink signal is received from the base station through a physical downlink shared channel (PDSCH).

4. A terminal configured to communicate with a base station in a wireless communication system, the terminal comprising:
  a transceiver configured to transmit and receive a signal; and
  a controller configured to:
  receive, from the base station, downlink control information (DCI) comprising scheduling information through a control resource set (CORESET),
  determine a time resource set to which the scheduling information is to be applied between a first time resource table and a second time resource table, wherein one of the first time resource table or the second time resource table is selected based on a position of the CORESET in a slot, and
  communicate with the base station according to time domain allocation information indicated by the scheduling information in the determined time resource set, wherein the first time resource table and the second time resource table are separately configured, wherein the first time resource table is selected in case that the position of the CORESET precedes a position of predetermined symbol, and wherein the second time resource table is selected in case that the position of the CORESET follows the position of predetermined symbol.

5. The terminal of claim 4, wherein,
the second time resource table has a timepoint coming after the first time resource table.

6. The terminal of claim 4, wherein the position of the CORESET is determined by a first or last symbol of the CORESET, and
the controller is configured to transmit an uplink signal to the base station through a physical uplink shared channel (PUSCH) or receive a downlink signal from the base station through a physical downlink shared channel (PDSCH).

7. A method for communicating with a terminal by a base station in a wireless communication system, the method comprising:
transmitting, to the terminal, downlink control information (DCI) comprising scheduling information through a control resource set (CORESET); and
communicating with the terminal according to time domain resource allocation information indicated by the scheduling information,
wherein a time resource set to which the scheduling information is to be applied is determined between a first time resource table and a second time resource table, wherein one of the first time resource table or the second time resource table is selected based on a position of the CORESET in a slot,
wherein the first time resource table and the second time resource table are separately configured,
wherein the first time resource table is selected in case that the position of the CORESET precedes a position of predetermined symbol, and
wherein the second time resource table is selected in case that the position of the CORESET follows the position of predetermined symbol.

8. The method of claim 7, wherein
the second time resource table has a timepoint coming after the first time resource table.

9. The method of claim 8, wherein the position of the CORESET is determined by a first or last symbol of the CORESET, and
in the communicating with the terminal, an uplink signal is received from the terminal through a physical uplink shared channel (PUSCH), or a downlink signal is transmitted to the terminal through a physical downlink shared channel (PDSCH).

10. A base station configured to communicate with a terminal in a wireless communication system, the base station comprising:
a transceiver configured to transmit and receive a signal; and
a controller configured to:
transmit, to the terminal, downlink control information (DCI) comprising scheduling information through a control resource set (CORESET), and
communicate with the terminal according to time domain resource allocation information indicated by the scheduling information,
wherein a time resource set to which the scheduling information is to be applied is determined between a first time resource table and a second time resource table, wherein one of the first time resource table or the second time resource table is selected based on a position of the CORESET in a slot,
wherein the first time resource table and the second time resource table are separately configured,
wherein the first time resource table is selected in case that the position of the CORESET precedes a position of predetermined symbol, and
wherein the second time resource table is selected in case that the position of the CORESET follows the position of predetermined symbol.

11. The base station of claim 10, wherein
the second time resource table has a timepoint coming after the first time resource table.

12. The base station of claim 11, wherein the position of the CORESET is determined by a first or last symbol of the CORESET, and
the controller is configured to transmit an uplink signal to the base station through a physical uplink shared channel (PUSCH) or receive a downlink signal from the base station through a physical downlink shared channel (PDSCH).

* * * * *